(12) United States Patent
Noguchi et al.

(10) Patent No.: US 10,001,104 B2
(45) Date of Patent: Jun. 19, 2018

(54) CONTROL APPARATUS FOR INTERNAL COMBUSTION ENGINE

(71) Applicant: DENSO CORPORATION, Kariya, Aichi-pref. (JP)

(72) Inventors: Hitoshi Noguchi, Kariya (JP); Hiroshi Okada, Kariya (JP); Hideki Kimura, Kariya (JP); Shinjirou Shimizu, Kariya (JP); Yuka Sugiura, Kariya (JP); Yousuke Yamamoto, Kariya (JP); Kiyoshi Iwade, Okazaki (JP)

(73) Assignee: DENSO CORPORATION, Kariya (JP)

( * ) Notice: Subject to any disclaimer, the term of this patent is extended or adjusted under 35 U.S.C. 154(b) by 5 days.

(21) Appl. No.: 14/956,964

(22) Filed: Dec. 2, 2015

(65) Prior Publication Data

US 2016/0160830 A1    Jun. 9, 2016

(30) Foreign Application Priority Data

Dec. 5, 2014    (JP) ................. 2014-247114

(51) Int. Cl.
*F02N 11/04*    (2006.01)
*F02N 15/08*    (2006.01)
(Continued)

(52) U.S. Cl.
CPC .............. *F02N 11/04* (2013.01); *F02B 67/06* (2013.01); *F02D 41/0002* (2013.01); *F02N 15/08* (2013.01); *F02N 19/00* (2013.01); *F02N 19/004* (2013.01); *F02N 19/005* (2013.01); *F16H 7/1281* (2013.01); *F01L 1/0532* (2013.01);
(Continued)

(58) Field of Classification Search
CPC .......... F02N 11/04; F02N 15/08; F02N 19/00; F02N 19/004; F02N 19/005; F02N 2019/008; F02N 2300/104; F02B 67/06; F02D 13/02; F02D 41/0002; F02D 2200/501; F02D 2200/602; F02D 2041/0011; F02D 23/2017;
(Continued)

(56) References Cited

U.S. PATENT DOCUMENTS 6,040,634 A * 3/2000 Larguier ................. B60K 6/26
                                                               290/45
8,671,903 B2 * 3/2014 Notani ................ F02N 11/0855
                                                              123/179.4
(Continued)

FOREIGN PATENT DOCUMENTS

EP    2128489 A2    12/2009
EP    2557295 A2    2/2013
(Continued)

*Primary Examiner* — Joseph Dallo
*Assistant Examiner* — Kurt Liethen
(74) *Attorney, Agent, or Firm* — Oliff PLC

(57) ABSTRACT

A control apparatus for an internal combustion engine is provided which works to control an electric motor to start the engine through a belt transmission system. The control apparatus restricts rotation of the electric motor so as to keep a speed of the electric motor below a speed at which the electric motor is capable of producing a maximum torque until a given period of time passes since the electric motor is actuated to start in the motor mode. This enables the electric motor to generate the maximum torque when it is required to crank the engine.

7 Claims, 9 Drawing Sheets

(51) Int. Cl.
*F02N 19/00* (2010.01)
*F02B 67/06* (2006.01)
*F02D 41/00* (2006.01)
*F16H 7/12* (2006.01)
*F01L 1/053* (2006.01)
*F01L 1/344* (2006.01)
*F16H 7/08* (2006.01)

(52) U.S. Cl.
CPC .................. *F01L 2001/0537* (2013.01); *F01L 2001/34496* (2013.01); *F02D 2041/001* (2013.01); *F02D 2200/501* (2013.01); *F02D 2200/602* (2013.01); *F02N 2019/008* (2013.01); *F02N 2300/104* (2013.01); *F16H 2007/0874* (2013.01); *F16H 2007/0885* (2013.01); *F16H 2007/0887* (2013.01); *Y02T 10/42* (2013.01)

(58) Field of Classification Search
CPC ........... F01L 2001/34496; F01L 1/0532; F01L 2001/0537; F16H 2007/0802
USPC ..................................................... 123/179.25
See application file for complete search history.

(56) References Cited

U.S. PATENT DOCUMENTS

| | | | |
|---|---|---|---|
| 2002/0059019 A1* | 5/2002 | Nakao | F02N 11/003 701/22 |
| 2004/0187842 A1* | 9/2004 | Yang | F01L 1/08 123/322 |
| 2006/0005807 A1* | 1/2006 | Megli | F01L 9/04 123/322 |
| 2008/0041336 A1* | 2/2008 | Gibson | F02D 13/04 123/322 |
| 2009/0298631 A1 | 12/2009 | Jud et al. | |
| 2012/0135097 A1* | 5/2012 | Arndt | B29C 49/4236 425/150 |
| 2013/0040770 A1 | 2/2013 | Wolf et al. | |
| 2014/0080668 A1* | 3/2014 | Doering | B60W 10/06 477/97 |
| 2014/0177405 A1 | 6/2014 | Rejda et al. | |
| 2014/0309882 A1* | 10/2014 | Antchak | F02B 67/06 701/36 |
| 2015/0167797 A1* | 6/2015 | Noguchi | F16H 7/1281 477/3 |

FOREIGN PATENT DOCUMENTS

| | | | | |
|---|---|---|---|---|
| JP | 2001-059555 A | 3/2001 | | |
| JP | 2003-314322 A | 11/2003 | | |
| JP | 2005-127199 A | 5/2005 | | |
| JP | 2006-299844 A | 11/2006 | | |
| JP | 2014-123418 A | 7/2014 | | |
| JP | 2015-117588 A | 6/2015 | | |
| JP | 2015-135106 A | 7/2015 | | |
| WO | WO 2016059456 A1 * | 4/2016 | ............ | F01L 13/06 |

* cited by examiner

CONTROL APPARATUS FOR INTERNAL COMBUSTION ENGINE

CROSS REFERENCE TO RELATED DOCUMENT

The present application claims the benefit of priority of Japanese Patent Application No. 2014-247114 filed on Dec. 5, 2014, disclosure of which is incorporated herein by reference.

BACKGROUND OF THE INVENTION

1. Technical Field

This disclosure relates generally to a control apparatus for internal combustion engines.

2. Background Art

Belt transmission systems are known which work to transmit power among an internal combustion engine, an electric motor, and an accessory mounted in, for example, an automobile using a belt. Japanese Patent First Publication No. 2001-59555 teaches a belt transmission system which uses two tensioners to adjust the degree of tension of a belt to a required level. The electric motor operates selectively either in a motor mode or in a regenerative mode. In the motor mode, the electric motor works as an engine starter to rotate a drive shaft of the internal combustion engine. In the regenerative mode, the electric motor works as an electric generator which is driven by the output power of the internal combustion engine. In recent years, attention has been focused on use of the electric motor in the motor mode to assist in driving the internal combustion engine.

Most electric motors used in the above type of belt transmission systems have the property that the degree of output torque of the motor is maximized when the speed of the motor is in a low range. This may lead to a risk that when the electric motor is actuated in the motor mode to start the internal combustion engine, and the speed of the electric motor becomes high due to stretching of the belt or swinging of the tensioners before the torque, as produced by the motor, is transmitted to the drive shaft of the internal combustion engine, the electric motor fails to produce the maximum torque or that when the torque of the electric motor starts being transmitted to the drive shaft of the internal combustion engine, an output shaft of the electric motor rotates without being subjected to any resistance, so that the speed of the electric motor rises quickly, thereby resulting in a failure in producing the maximum torque.

SUMMARY

It is therefore an object to provide a control apparatus which is engineered to enable an electric motor to produce a maximum degree of torque when the electric motor operates in a motor mode to start an internal combustion engine through a belt transmission system.

According to one aspect of the invention, there is provided a control apparatus for an internal combustion engine equipped with a drive shaft pulley, an electric motor, a motor shaft pulley, a belt, and a first tensioner, the drive shaft pulley being joined to a drive shaft of an internal combustion engine, the motor shaft pulley being joined to a motor shaft of the electric motor, the belt being wound around the drive shaft pulley and the motor shaft pulley, the first tensioner being placed in contact with the belt between the drive shaft pulley and the motor shaft pulley. The control apparatus comprises a pulley moving controller, a starter controller, and a rotation controller. The pulley moving controller works to actuate the electric motor in a motor mode to move the first tensioner pulley away from a reference position toward a given target position before an engine start request is made to start the internal combustion engine. The reference position is a position where the first tensioner pulley lies when the internal combustion engine and the electric motor are both at rest. The target position is defined to be away from the belt in a movable range of the first tensioner pulley. The starter controller works to actuate the electric motor in the motor mode to rotate the drive shaft of the internal combustion engine when the engine start request is made. The rotation controller works to restrict rotation of the electric motor so as to keep a speed of the electric motor at or below a speed at which the electric motor is capable of producing a maximum torque until a given period of time passes from when the starter controller starts actuating the electric motor in the motor mode.

In operation, when it is required to actuate the electric motor in the motor mode to start the internal combustion engine, the belt stretching or swinging of the first tensioner will be reduced. The electric motor will also be subjected to a desired resistance to rotation thereof when the output torque of the electric motor starts being transmitted to the drive shaft of the internal combustion engine, thereby avoiding an undesirably quick rise in speed of the electric motor. In other words, the electric motor is prevented from rotating over a speed at which the electric motor will produce the maximum torque before an actual degree of torque outputted by the electric motor reaches the maximum torque, thus enabling the electric motor to produce the maximum torque when actuated in the motor mode to start the internal combustion engine.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1A:
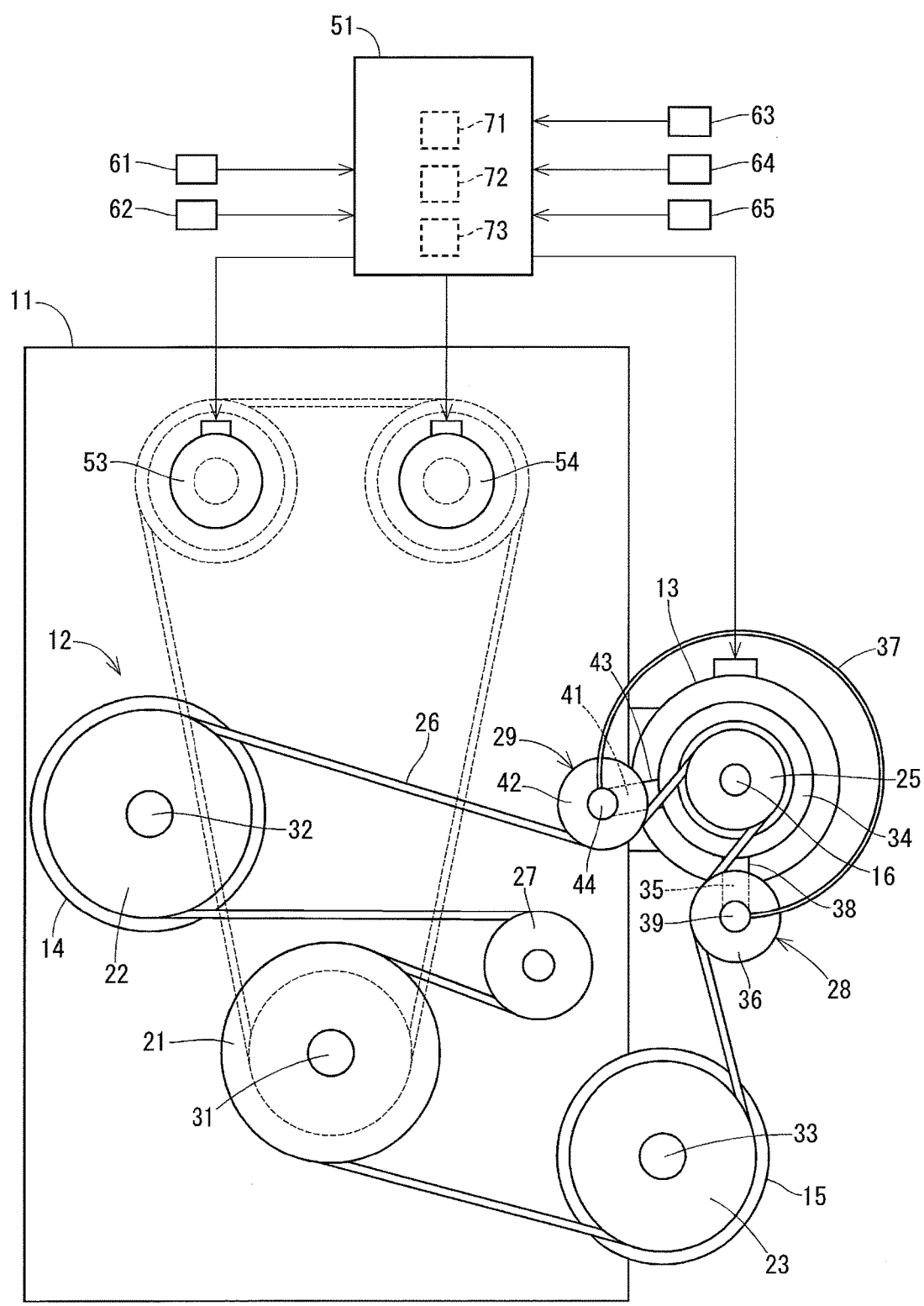
FIG. 1(a) is a schematic view which illustrates an internal combustion engine and a control apparatus according to a first embodiment which works to control an operation of the internal combustion engine.

Referring to the drawings, wherein like reference numbers refer to like parts in several views, there are shown power transmission systems according to embodiments.
First Embodiment FIG. 1(a) illustrates a control apparatus 51 for an internal combustion engine 11 mounted in, for example, an automotive vehicle. The engine 11 is equipped with a crankshaft 31 (i.e., a drive shaft), an electric motor 13, and a belt transmission system 12 which works to achieve transmission of power or torque between accessories 14 and 15.
Belt Transmission System The structure of the belt transmission system 12 will be described below with reference to FIGS. 1 and 2.

The belt transmission system 12 is equipped with a drive shaft pulley 21, accessory pulleys 22 and 23, the motor 13, a belt 26, an idler pulley 27, a first tensioner 29, and a second tensioner 28.

The drive shaft pulley 21 is joined at the center thereof to the crankshaft 31 (i.e., an output shaft) of the engine 11, so that the drive shaft pulley 21 is rotatable following rotation of the crankshaft 31. The crankshaft 31 is coupled to a clutch 17 illustrated in FIG. 2. The clutch 17 works to selectively establish or block mechanical connection between the crankshaft 31 and a transmission 18 (i.e., a speed variator). The transmission 18 is an object to be driven by the crankshaft 31 and works as a part of a drive train of the vehicle. The transmission 18 is joined to driven wheels of the vehicle through a drive shaft not shown.

The accessory pulley 22 is joined at the center thereof to an input shaft 32 of the accessory 14, so that the accessory pulley 22 is rotatable along with the input shaft 32. The accessory 14, as referred to in this embodiment, is a water pump installed in the vehicle.

The accessory pulley 23 is joined at the center thereof to an input shaft 33 of the accessory 15, so that the accessory pulley 23 is rotatable along with the input shaft 33. The accessory 15, as referred to in this embodiment, is a compressor for an air conditioner installed in the vehicle.

The electric motor 13 is a motor-generator which selectively operates in a motor mode or in a regenerative mode. When it is required to start the engine 11, the motor 13 works as a starter in the motor mode to rotate the crankshaft 31. The motor 13 also works in the motor mode to perform an assist function to assist in driving the engine 11. The motor 13 also functions as an electric generator in the regenerative mode.

The motor 13 has a motor shaft (i.e., an output shaft) 16 joined to a motor shaft pulley 25 to be rotatable together.

The belt 26 is made in the shape of an annular endless loop. The belt 26 is wound around the drive shaft pulley 21, the motor shaft pulley 25, and the accessory pulleys 22 and 23. Rotation of each of the drive shaft pulley 21, the motor shaft pulley 25, and the accessory pulleys 22 and 23 is transmitted through the belt 9 to another. In the example illustrated in FIG. 1(a), the drive shaft pulley 21, the accessory pulley 22, the motor 13, and the accessory pulley 23 are arranged in this order in a direction of movement or rotation of the belt 26. The belt 25 is made of rubber and expands or contracts elastically when subjected to an external force.

The idler pulley 27 is disposed between the drive shaft pulley 21 and the accessory pulley 22.

The first tensioner 29 works to regulate the degree of tension of the belt 26 in the direction of rotation of the belt 26 between the drive shaft pulley 21 and the motor shaft pulley 25. The first tensioner 29 is disposed between the accessory pulley 22 and the motor shaft pulley 25 and includes a base 34, an arm 41, a tensioner pulley 42, and a biasing member 37. The base 34 is secured to a housing of the motor 13. The arm 41 has a base end 43 connected to the base 34 to be rotatable around the motor shaft 16. The tensioner pulley 42 serves as an idler pulley placed in contact with the belt 26 between the accessory pulley 22 and the motor shaft pulley 25. The tensioner pulley 42 is retained by the tip end 44 of the arm 41 to be rotatable and movable against or away from the belt 26. The biasing member 37 is a coil spring disposed between the tip end 44 of the arm 41 and a tip end 39 of an arm 35 which will be described later in detail. The biasing member 37 urges the arm 41 to press the tensioner pulley 42 against the belt 26 to increase the tension of the belt 26.

The second tensioner 28 works to regulate the degree of tension of the belt 26 in the direction of rotation of the belt 26 between the motor shaft pulley 25 and the drive shaft pulley 21. The second tensioner 28 is disposed between the motor shaft pulley 25 and the accessory pulley 23 includes the base 34, the arm 35, a tensioner pulley 36, and the biasing member 37. The arm 35 has a base end 38 connected to the base 34 to be rotatable around the motor shaft 16. The tensioner pulley 36 serves as an idler pulley placed in contact with the belt 26 between the motor shaft pulley 25 and the accessory pulley 23. The tensioner pulley 36 is retained by the tip end 39 of the arm 35 to be rotatable and movable against or away from the belt 26. The biasing member 37 urges the arm 41 to press the tensioner pulley 36 against the belt 26 to increase the tension of the belt 26.

When it is required to actuate the motor 13 to perform either the starter function or the assist function, the belt transmission system 12 works to transmit the output torque of the motor shaft 16, as produced in the motor mode, to the drive shaft pulley 21 through the motor shaft pulley 25 and the belt 26, thereby rotating the crankshaft 31.

When it is required to operate the motor 13 in the regenerative mode, the belt transmission system 12 works to transmit the output torque (i.e., engine torque) of the crankshaft 31 to the motor shaft pulley 25 through the drive shaft pulley 21 and the belt 26, thereby rotating the motor shaft 16.

An electronically controlled device, i.e., the electric motor 13 installed in the belt transmission system 12 is controlled in operation by the control apparatus 51. The control apparatus 51 works to control the operation of the motor 13 to regulate an operating condition of the belt transmission system 12.
Control Apparatus The control apparatus 51 will be described with reference to FIGS. 1 to 4.

The control apparatus 51 is implemented by a microcomputer and electrically connected to electronically controlled devices or sensor installed in the vehicle.

Figure 1B:
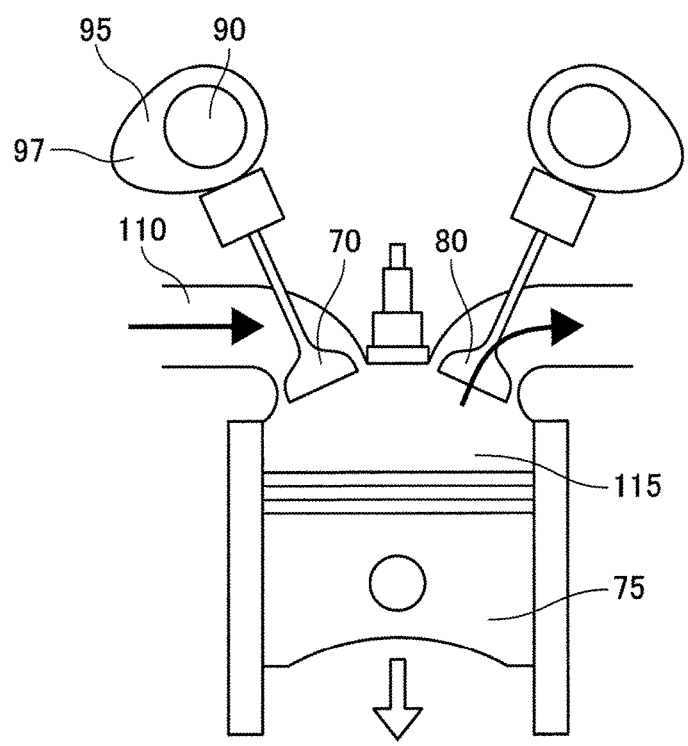
FIG. 1(b) is a longitudinal sectional view which illustrates an internal structure of the internal combustion engine in FIG. 1(a)
Figure 2:
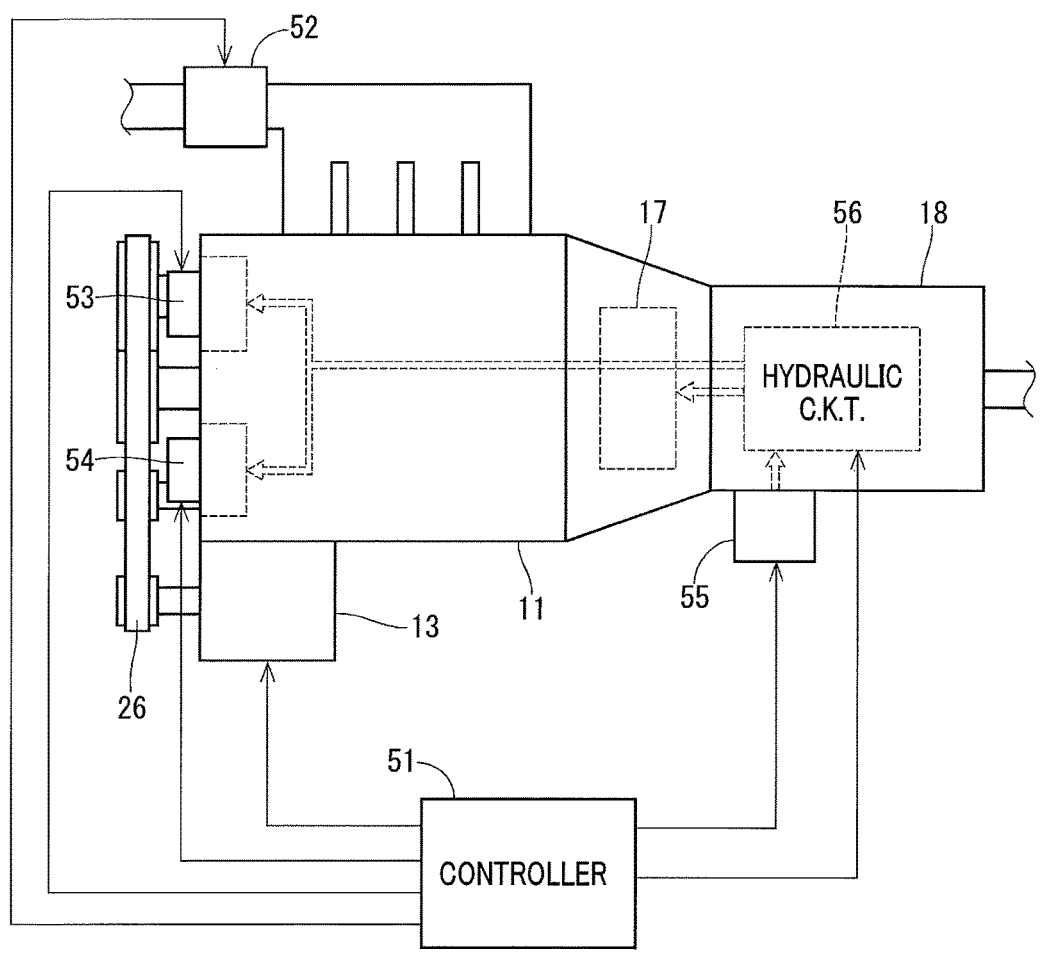
FIG. 2 is a schematic view which illustrates a portion of a drive train for an automotive vehicle on which the internal combustion engine in FIGS. 1(a) and 1(b) is mounted.

In this embodiment, the electronically controlled devices include, as illustrated in FIGS. 1 and 2, the motor 13, the clutch 17, the throttle valve 52, the valve timing controllers 53 and 54, a fuel injection system (not shown), and an ignition system (not shown). The valve timing controller 53 works to control or regulate the valve timing (i.e., timing of opening and closing) of the intake valve 70 for each of cylinders 115 (only one is shown in FIG. 1(*a*) for the brevity of illustration) of the internal combustion engine 11. Similarly, the valve timing controller 54 works to control or regulate the valve timing (i.e., timing of opening and closing) of the exhaust valve 80 of each of the cylinders 115 of the internal combustion engine 11. The clutch 17, the throttle valve 52, and the valve timing controllers 53 and 54 are operable when the engine 11 is at rest. For instance, the clutch 17 and the valve timing controllers 53 and 54 are driven by hydraulic pressure developed by hydraulic oil, as discharged from the electrically powered oil pump 55 and then regulated in pressure by the hydraulic circuit 56. The throttle valve 52 works to open or close the intake passage 110, as illustrated in FIG. 1(*b*), through which air is admitted into the cylinders 115 of the internal combustion engine 11.

The above sensors include the brake pedal sensor 61, the accelerator pedal sensor 62, the crank angle sensor 63, the cam angle sensor 64, and the vehicle speed sensor 65. The brake pedal sensor 61 works as a brake position sensor to measure the degree to which a brake pedal installed in the vehicle is depressed. The accelerator pedal sensor 61 works as an accelerator position sensor to measure the degree to which an accelerator pedal installed in the vehicle is depressed.

The control apparatus 51 monitors outputs from the sensors to execute given tasks or programs to control the operations of the electronically controlled devices.

Figure 4:
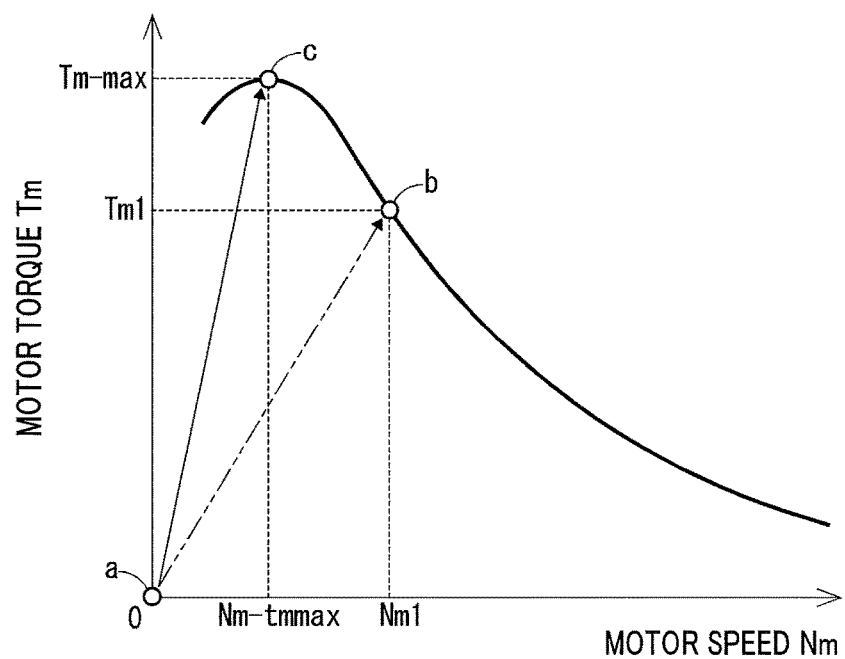
FIG. 4 is a view which demonstrates the Cartesian coordinate system representing an output torque characteristic of an electric motor to be controlled by the control apparatus of FIG. 1(a)

The electric motor 13 is engineered to have the property that the output torque is maximized when the speed of the electric motor 13 is relatively low. This, as described above, may lead to a risk that when the electric motor 13 is actuated in the motor mode to start the internal combustion engine 11, and the speed of the electric motor 13 becomes high due to stretching of the belt 26 or swinging of the tensioner 28 or 29 before the torque, as produced by the electric motor 13, is transmitted to the crankshaft 31 of the internal combustion engine 11, the electric motor 13 fails to produce the maximum torque or that when the output torque of the electric motor 13 starts being transmitted to the crankshaft 31 of the internal combustion engine 11, the motor shaft 31 rotates without being subjected to any resistance, so that the speed of the electric motor 13 rises quickly, thereby resulting in a failure in producing the maximum torque. FIG. 4 demonstrates the Cartesian coordinate system representing an output torque characteristic of the electric motor 13. The horizontal axis indicates the speed Nm of the electric motor 13. The vertical axis indicates the torque Tm produced by the electric motor 13. A curved line is plotted by maximum values of torque which the electric motor 13 is capable of producing for different values of the speed Nm of the electric motor 13. The output torque characteristic shows that when the operating point a of the electric motor 13 is changed to the operating point b resulting from a quick rise in speed Nm of the electric motor 13 from 0 to Nm1, the torque Tm which the electric motor 13 is capable of producing at the operating point b is the torque Tm1 which is lower than the maximum torque Tm-max, that is, the electric motor 13 is not capable of outputting the maximum torque Tm-max at the operating point b.

Figure 3:
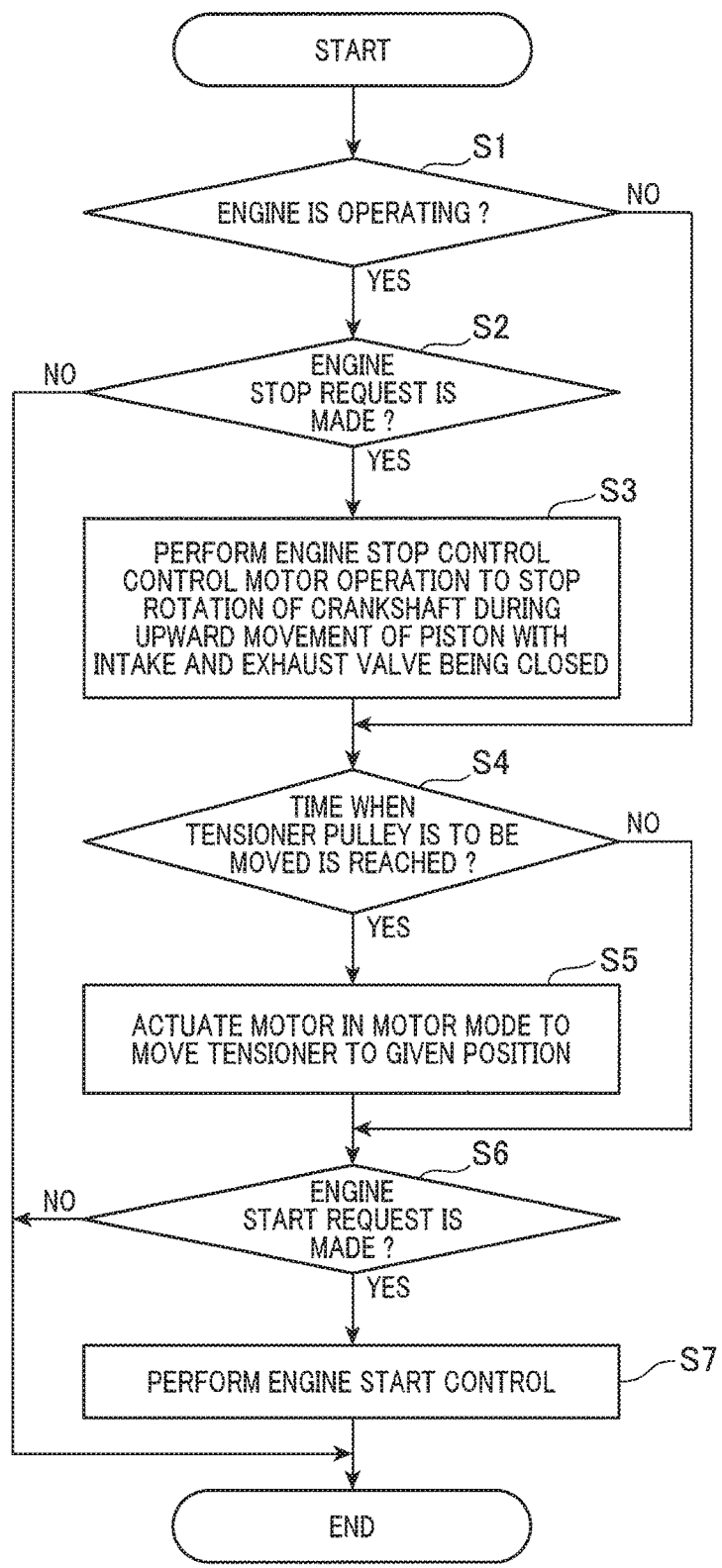
FIG. 3 is a flowchart of a motor control program executed by the control apparatus of FIG. 1(a)

In order to alleviate the above problem, the control apparatus 51 is designed to perform a task or program, as illustrated in FIG. 3, to keep the speed Nm of the electric motor 13 below a speed Nm-tmmax at which the electric motor 13 will output a maximum degree of torque (i.e., the maximum torque Tm-max), thereby moving the operation characteristic of the electric motor 13 from the operating point a directly to the operating point c to enable the electric motor 13 to output the maximum torque Tm-max. The program of FIG. 3 consists of a sequence of logical steps and is executed cyclically when the control apparatus 51 is operating.

After entering the program, the routine proceeds to step S1 wherein it is determined whether the engine 11 is operating or not. If a NO answer is obtained meaning that the engine 11 is not operating, the routine then proceeds directly to step S4.

Alternatively, if a YES answer is obtained in step S1, then the routine proceeds to step S2 wherein it is determined whether an engine stop request to stop the engine 11 has been made or not. For instance, when it is required to cut off supply of fuel to the engine 11 while the vehicle is freewheeling with the accelerator pedal released or when it is required to stop idling of the engine 11 when the vehicle is at rest, and the brake pedal is near at a fully depressed position, the engine stop request is made. If a YES answer is obtained in step S2, then the routine proceeds to step S3. Alternatively, if a NO answer is obtained, then the routine terminates.

In step S3, engine stop control is executed to stop the engine 11. Specifically, when the engine 11 is stopped from operating, the control apparatus 51 controls the electric motor 13 to stop the crankshaft 31 from rotating during movement of a piston 75 from the bottom dead center to the top dead center within at least one of cylinders 115 of the engine 11 with intake valve 70 and the exhaust valve 80 of the one of the cylinders 115 being closed. This causes the air being compressed by the piston 75 within the one of the cylinders 115 to create an increasing reactive force acting on the piston 75, so that the resistance to rotation of the crankshaft 31 increases. This increased resistance will serve to suppress rotation of the motor shaft 16 so as to keep the speed of the motor 13 below the speed Nm-tmmax at which the motor 13 is capable of producing the maximum torque Tm-max until a given period of time passes following next actuation of the motor 13 in the motor mode to start the engine 11. The given period of time is set to, for example, a length of time required for the speed of the engine 11 to rise from zero to a minimum startable speed at which the engine 11 is enabled to start.

After step S3, the routine proceeds to step S4 wherein it is determined whether a travel start time when the tensioner pulley 42 is to be moved to a given target position before an engine start request is made to start the engine 11 is reached or not. If the position where the tensioner pulley 42 lies when both the engine 11 and the motor 13 are at rest is defined as a reference position, the target position is located away from the reference position in a direction in which the tensioner pulley 42 travels within a movable range. In this embodiment, the target position is an end of the movable range of the tensioner pulley 42 which is far away from the belt 26. For example, when the engine 11 is undergoing the fuel cut, the speed of the engine 11 has dropped below the minimum startable speed, a YES answer is obtained in step S4 meaning that the travel start time is reached. Alternatively, assuming that the degree B to which the brake pedal is depressed increases from zero to B1, to B2, to B3, to B4, and to B5 which is the degree to which the brake pedal is fully depressed, when a relation of B3≤B≤B4 is met while the idling of the engine 11 is stopped, a YES answer is obtained in step S4 meaning that the travel start time is reached.

If a NO answer is obtained in step S4, the routine proceeds directly to step S6. Alternatively, if a YES answer is obtained in step S4, then the routine proceeds to step S5 wherein the motor 13 is actuated in the motor mode to move the tensioner pulley 42 to the target position. Specifically, the control apparatus 51 controls the operation of the motor 13 so as to produce a degree of torque which will move the tensioner pulley 42, but not rotate the drive shaft pulley 21, in other words, keeps the drive shaft pulley 21 stationary.

After step S5, the routine proceeds to step S6 wherein it is determined whether an engine start request has been made or not. For example, when the idling of the engine 11 is stopped, and a relation of B1≤B≤B2 is met, the engine start request is made to restart the engine 11. If a YES answer is obtained, then the routine proceeds to step S7. Alternatively, if a NO answer is obtained, then the routine terminates.

In step S7, engine start control is performed. For example, when the engine 11 is undergoing the fuel cut, and the speed of the engine 11 is higher than or equal to the minimum startable speed, the control apparatus 51 starts the engine 11 using the fuel injection system and the ignition system without use of the motor 13 as the engine starter. Alternatively, when the engine 11 is undergoing the fuel cut, and the speed of the engine 11 is lower than the minimum startable speed and/or when the idling of the engine 11 is stopped, the control apparatus 51 first actuates the motor 13 in the motor mode to rotate the crankshaft 31. Afterwards, when the speed of the engine 11 exceeds the minimum startable speed, the control apparatus 51 restarts the engine 11 using the fuel injection system and the ignition system. The routine then terminates.

The control apparatus 61 is equipped with the rotation controller 71 implemented by the operation in step S3, the pulley moving controller 72 implemented by the operation in step S5, and the starter controller 73 implemented by the operation in step S7. The rotation controller 71, the pulley moving controller 72, and the starter controller 73 may be realized in software form by executing a program, as stored in a ROM, in a CPU or in hardware form using electronic circuits.

Beneficial Effects

As apparent from the above discussion, the control apparatus 51 includes the pulley moving controller 72, the starter controller 73, and the rotation controller 71. The pulley moving controller 72 works to actuate the motor 13 in the motor mode to move the tensioner pulley 42 to the target position prior to the engine start request. The starter controller 73 works to actuate the motor 13 to rotate the crankshaft 31 to crank the engine 11 when the engine start request is made. The rotation controller 71 works to restrict the rotation of the motor 13 so as to keep the speed of the motor 13 below the speed Nm-tmmax corresponding to the maximum torque Tm-max until the given period of time passes from when the starter controller 73 starts actuating the motor 13 in the motor mode.

The above control of the motor 13 suppresses the stretching of the belt 26 or the swing motion of the tensioners 28 and 29 when the motor 13 starts in the motor mode to crank the engine 11 and also restricts the rotation of the motor shaft 16 when the output torque of the motor 13 starts to be transmitted to the crankshaft 31 in order for the speed of the motor 13 not to exceed the speed Nm-tmmax corresponding to the maximum torque Tm-max before the output torque of the motor 13 reaches the maximum torque Tm-max. This enables the motor 13 to produce the maximum torque Tm-max in a period of time in which the speed of the engine 11 increases from zero to the minimum startable speed when the motor 13 is actuated in the motor mode to start the engine 11.

The rotation controller 71 of the control apparatus 51 works to increase the resistance to rotation of the crankshaft 31 when the starter controller 73 starts actuating the motor 13 in the motor mode to suppress the rotation of the motor shaft 16, thereby keeping the speed of the motor 13 below the speed Nm-tmmax corresponding to the maximum torque Tm-max until the given period of time passes from when the starter controller 73 starts actuating the motor 13 in the motor mode.

The rotation controller 71, as described above, controls the operation of the motor 13 to stop the crankshaft 31 from rotating during movement of the piston 75 from the bottom dead center to the top dead center within at least one of the cylinders 115 of the engine 11 with the intake valve 70 and the exhaust valve 80 of the one of the cylinders 115 being closed. This results in an increase in resistance to the rotation of the crankshaft 31 when the starter controller 73 starts rotating the motor 13 in the motor mode.

Second Embodiment

Figure 5:
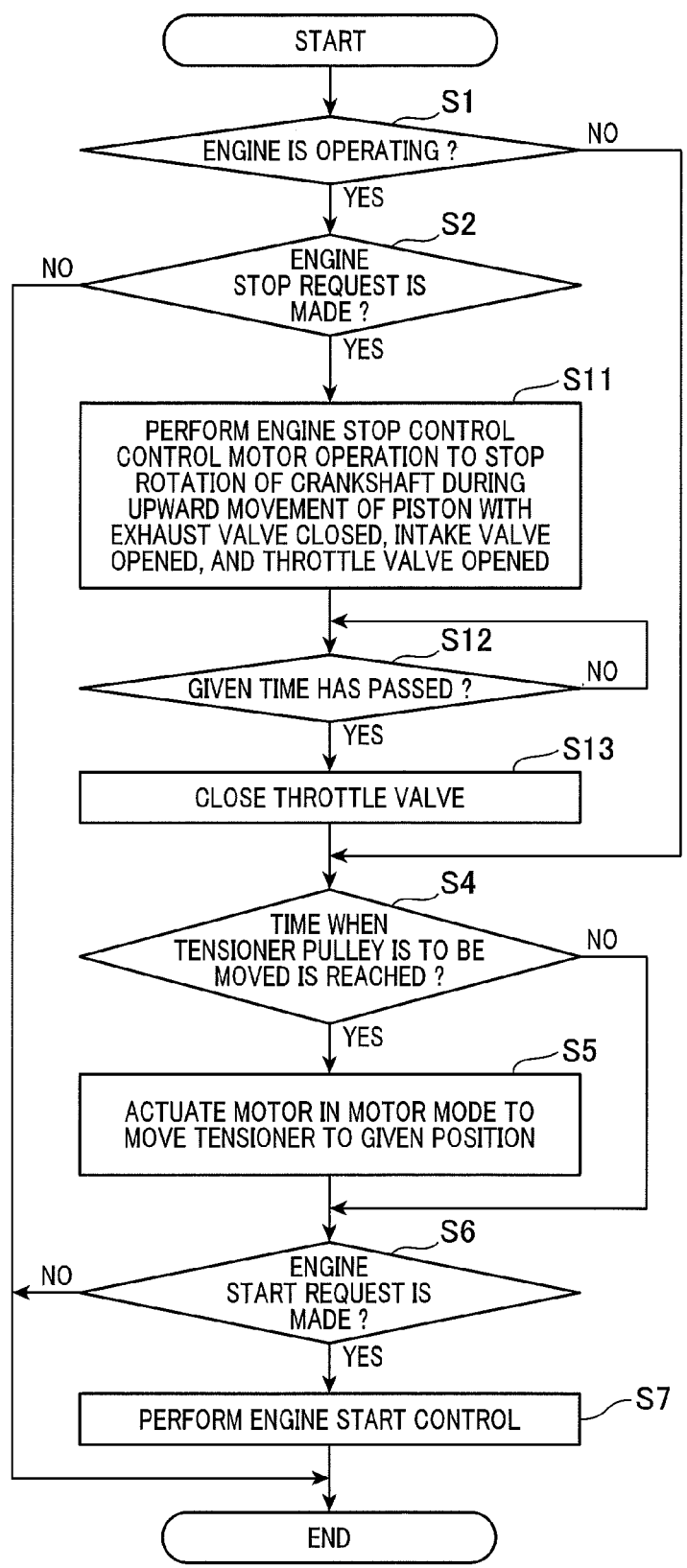
FIG. 5 is a flowchart of a motor control program executed by a control apparatus according to a second embodiment.

FIG. 5 shows a motor control program to be executed by the control apparatus 51 according to the second embodiment. The same step numbers as employed in FIG. 3 in the first embodiment will refer to the same operations, and explanation thereof in detail will be omitted here.

If a YES answer is obtained in step S2 meaning that the engine stop request has been made, then the routine proceeds to step S11 wherein engine stop control is executed to stop the engine 11. Specifically, when the engine 11 is stopped from operating, the control apparatus 51 controls the electric motor 13 to stop the rotation of the crankshaft 31 during upward movement of the piston 75 from the bottom dead center to the top dead center within at least one of cylinders 115 of the engine 11 with the exhaust valve 80 for that cylinder 115 being closed, the intake valve 70 for that cylinder 115 being opened, and the throttle valve 52 being opened. After step S11, the routine proceeds to step S12.

In step S12, it is determined whether a given period of time has passed following the stop of the engine 11 or not. If a YES answer is obtained, then the routine proceeds to step S13. Alternatively, if a NO answer is obtained, then the routine repeats step S12.

In step S13, the throttle valve 52 is closed. This causes the air in a portion of the intake pipe and in the above one of the cylinders 115 being compressed by the piston 75 to create an increasing reactive force acting on the piston 75, so that the resistance to rotation of the crankshaft 31 increases. This increased resistance will serve to suppress rotation of the motor shaft 16 so as to keep the speed of the motor 13 below the speed Nm-tmmax at which the motor 13 is capable of producing the maximum torque Tm-max until a given period of time passes following next actuation of the motor 13 in the motor mode to start the engine 11. The given period of time may be set to the same length of time as determined in the first embodiment. After step S13, the routine proceeds to step S4.

The control apparatus 51 may be designed to have the rotation controller 71 which executes steps S11 to S13. The motor control in FIG. 5, like in the first embodiment, enables the motor 13 to produce the maximum torque Tm-max when the motor 13 operates in the motor mode to start the engine 11.

Third Embodiment

Figure 6:
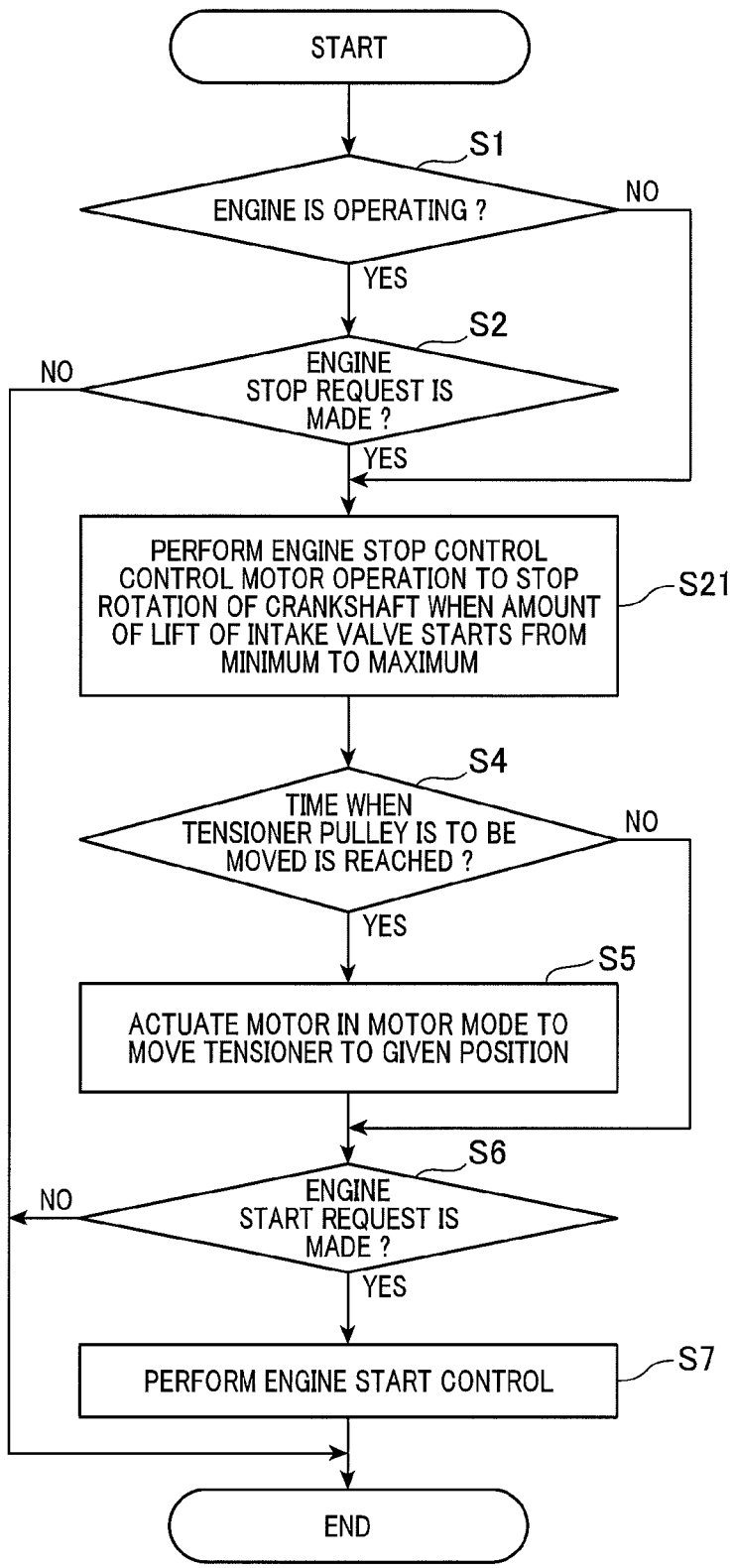
FIG. 6 is a flowchart of a motor control program executed by a control apparatus according to a third embodiment.

FIG. 6 shows a motor control program to be executed by the control apparatus 51 according to the third embodiment. The same step numbers as employed in FIG. 3 in the first embodiment will refer to the same operations, and explanation thereof in detail will be omitted here.

If a YES answer is obtained in step S2 meaning that the engine stop request has been made, then the routine proceeds to step S21 wherein engine stop control is executed to stop the engine 11. Specifically, when the engine 11 is stopped from operating, the control apparatus 51 controls the electric motor 13 to stop the rotation of the crankshaft 31 when the amount of lift of the intake valve 70 for at least one of the cylinders 115 of the engine 11 starts changing from a minimum amount of lift thereof to a maximum amount of lift thereof, in other words, the intake valve 70 starts being lifted upward. This causes a reactive force acting on the camshaft 90, as produced when the nose 97 of the cam 95 for the intake valve 70 passes an end of the intake valve 70, to increase the resistance to rotation of the crankshaft 31. This increased resistance will serve to suppress rotation of the motor shaft 16 so as to keep the speed of the motor 13 below the speed Nm-tmmax at which the motor 13 will produce the maximum torque Tm-max until a given period of time passes following next actuation of the motor 13 in the motor mode to start the engine 11. The given period of time may be set to the same length of time as determined in the first embodiment. After step S21, the routine proceeds to step S4.

The control apparatus 51 may be designed to have the rotation controller 71 which executes step S21. The motor control in FIG. 6, like in the first embodiment, enables the motor 13 to produce the maximum torque Tm-max when the motor 13 operates in the motor mode to start the engine 11.

Fourth Embodiment

Figure 7:
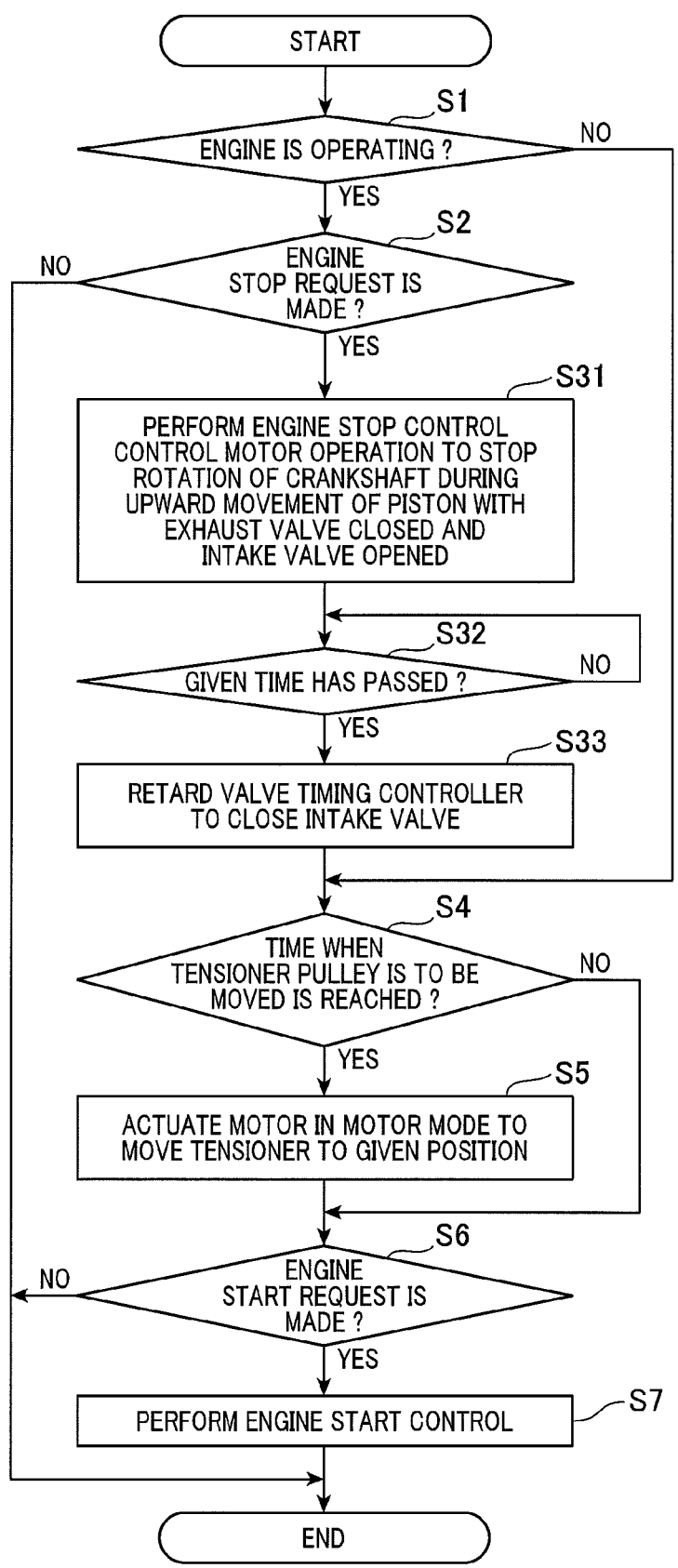
FIG. 7 is a flowchart of a motor control program executed by a control apparatus according to a fourth embodiment.

FIG. 7 shows a motor control program to be executed by the control apparatus 51 according to the fourth embodiment. The same step numbers as employed in FIG. 5 in the second embodiment will refer to the same operations, and explanation thereof in detail will be omitted here.

If a YES answer is obtained in step S2 meaning that the engine stop request has been made, then the routine proceeds to step S31 wherein engine stop control is executed to stop the engine 11. Specifically, when the engine 11 is stopped from operating, the control apparatus 51 controls the electric motor 13 to stop the rotation of the crankshaft 31 during upward movement of the piston 75 from the bottom dead center to the top dead center within at least one of cylinders 115 of the engine 11 with the exhaust valve 80 for the one of the cylinders 115 being closed and the intake valve 70 for the one of the cylinders 115 being opened. After step S31, the routine proceeds to step S32.

In step S32, it is determined whether a given period of time has passed following the stop of the engine 11 or not. If a YES answer is obtained, then the routine proceeds to step S33. Alternatively, if a NO answer is obtained, then the routine repeats step S32.

In step S33, the valve timing controller 53 is retarded to close the intake valve 70. In other words, the valve timing of the intake valve 70 is retarded and closed using the valve timing controller 53. This causes a reactive force acting on the camshaft 90, as produced when the nose 97 of the cam 95 for the intake valve 70 passes the end of the intake valve 70, to increase the resistance to rotation of the crankshaft 31. This increased resistance will serve to suppress rotation of the motor shaft 16 so as to keep the speed of the motor 13 below the speed Nm-tmmax at which the motor 13 will produce the maximum torque Tm-max for a given period of time following next actuation of the motor 13 in the motor mode to start the engine 11. The given period of time may be set to the same length of time as determined in the first embodiment. After step S33, the routine proceeds to step S4.

The control apparatus 51 may be designed to have the rotation controller 71 which executes steps S31 to S33. The motor control in FIG. 7, like in the first embodiment, enables the motor 13 to produce the maximum torque Tm-max when the motor 13 starts operating in the motor mode to crank the engine 11.

Fifth Embodiment

Figure 8:
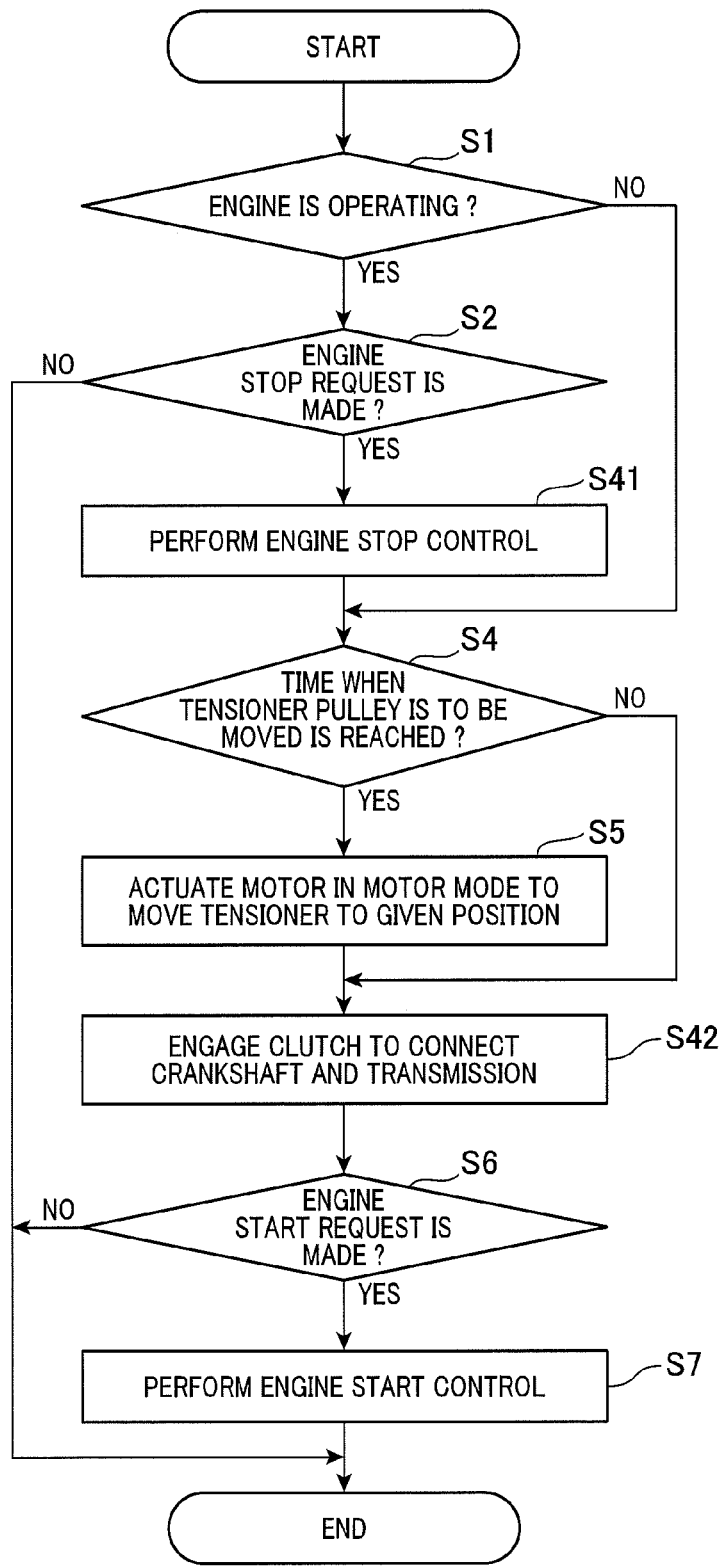
FIG. 8 is a flowchart of a motor control program executed by a control apparatus according to a fifth embodiment.

FIG. 8 shows a motor control program to be executed by the control apparatus 51 according to the fifth embodiment. The same step numbers as employed in FIG. 3 in the first embodiment will refer to the same operations, and explanation thereof in detail will be omitted here.

If a YES answer is obtained in step S2 meaning that the engine stop request has been made, then the routine proceeds to step S41 wherein engine stop control is executed to stop the engine 11 in a usual way or one of the ways, as described in the first to fourth embodiments, which increases the resistance to rotation of the crankshaft 31. Specifically, the control apparatus 51 stops the operation of the engine 11.

After step S41, the routine proceeds to steps S4 and S5 to perform the same operations as in FIG. 3.

After step S5, the routine proceeds to step S42 wherein the clutch 17 is engaged to mechanically connect the crankshaft 31 and the transmission 18. This results in an increase in resistance to rotation of the crankshaft 31 which arises from addition of weight of the transmission 18 to the crankshaft 31. This increased resistance will serve to suppress rotation of the motor shaft 16 so as to keep the speed of the motor 13 below the speed Nm-tmmax at which the motor 13 will produce the maximum torque Tm-max until a given period of time passes following next actuation of the motor 13 in the motor mode to start the engine 11. The given period of time is set to, for example, a length of time required for the speed of the engine 11 to rise from zero to a minimum startable speed at which the engine 11 is enabled to start.

The control apparatus 51 may be designed to have the rotation controller 71 which executes step S42. The motor control in FIG. 8, like in the first embodiment, enables the motor 13 to produce the maximum torque Tm-max when the motor 13 operates in the motor mode to crank the engine 11.

MODIFICATIONS

The target position to which the tensioner pulley 42 is to be moved in step S4 may alternatively be set to between the reference position and the end of the movable range which is farthest from the reference position in the direction in which the tensioner pulley 42 is movable away from the belt 26.

The engine 11 may be equipped with a tensioner retainer which retains the tensioner pulleys 36 and/or 42 firmly at a selected position. The control apparatus 51 may stop the motor 13 when the tensioner pulleys 36 and/or 42 is held by the tensioner retainer from moving, thereby lowering power consumption of the motor 13.

The control apparatus 51 may determine in step S4 that the travel start time is reached when a given pulley standby time passes since the engine 11 is stopped during idling of the engine 11. The determination that the travel start time is reached may be made depending upon the brake pressure, learned history data on a time interval between the stop of the engine 11 and issuing of an engine restart request to restart the engine 11, information about a distance between the vehicle equipped with the control apparatus 51 and a preceding vehicle traveling ahead, and/or traffic information about traffic jams or traffic lights in addition to or in place of the depressed position of the brake pedal.

The control apparatus 51 may be engineered to cyclically turns on or off the motor 13 to move the tensioner pulley 42 to the target position until the engine restart request is made after the engine 11 is stopped. This reduces the power consumption of the motor 13 as compared with when the motor 13 is kept on to move the tensioner pulley 42 to the target position.

In the third embodiment, the control apparatus 51, as described already, controls the operation of the electric motor 13 to stop the rotation of the crankshaft 31 when the amount of lift of the intake valve 70 for at least one of the cylinders 115 of the engine 11 starts changing from the minimum amount of lift to the maximum amount of lift, but however, the control apparatus 51 may alternatively be designed to control the operation of the electric motor 13 to stop the rotation of the crankshaft 31 when the amount of lift of the intake valve 70 for at least one of the cylinders 115 of the engine 11 is increasing from the minimum amount of lift to the maximum amount of lift. This also causes the reactive force acting on the camshaft 90, as produced when the nose 97 of the cam 95 for the intake valve 70 passes the end of the intake valve 70, to increase the resistance to rotation of the crankshaft 31.

The control apparatus 51 may optionally be used with the belt transmission system 12 which is not equipped with the second tensioner 28.

The first tensioner 29 and the second tensioner 28 are, as apparent from the above discussion, swing tensioners, but may be implemented by another type of tensioners.

The first and second tensioners 29 and 28 are equipped with the biasing member 37 shared with each other, but may alternatively include discrete biasing members such as springs, respectively.

The first tensioner 29 may alternatively be disposed between the drive shaft pulley 21 and the accessory pulley 22 or 23. In other words, the first tensioner 29 may be located anywhere as long as the first tensioner 29 works to regulate the tension of the belt 26 between the motor shaft pulley 25 and the drive shaft pulley 21 in the direction of rotation of the belt 26.

The second tensioner 28 may alternatively be disposed between the drive shaft pulley 22 or 23. In other words, the second tensioner 28 may be located anywhere as long as the second tensioner 28 works to regulate the tension of the belt 26 between the drive shaft pulley 21 and the motor shaft pulley 25 in the direction of rotation of the belt 26.

The control apparatus 51 of the first embodiment is engineered to control the operations of the electronically controlled devices in addition to the motor 13, but however, another controller may be provided only for controlling the operations of the electronically controlled devices.

The belt 26 may be made of metal such as wire instead of rubber.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A control apparatus for an internal combustion engine equipped with a drive shaft pulley, an electric motor, a motor shaft pulley, a belt, and a first tensioner, the drive shaft pulley being joined to a drive shaft of an internal combustion engine, the motor shaft pulley being joined to a motor shaft of the electric motor, the belt being wound around the drive shaft pulley and the motor shaft pulley, the first tensioner being equipped with a first tensioner pulley which is placed in contact with the belt between the drive shaft pulley and the motor shaft pulley, the control apparatus comprising:
a pulley moving controller which works to actuate the electric motor in a motor mode to move the first tensioner pulley away from a reference position toward a given target position before an engine start request is made to start the internal combustion engine, the reference position being a position where the first tensioner pulley lies when the internal combustion engine and the electric motor are both at rest, the target position being defined to be away from the belt in a movable range of the first tensioner pulley;
a starter controller which works to actuate the electric motor in the motor mode to rotate the drive shaft of the internal combustion engine when the engine start request is made; and
a rotation controller that controls operation of the electric motor to restrict rotation of the electric motor so as to keep a speed of the electric motor below a speed at which the electric motor produces a maximum torque until a given period of time passes from when the starter controller starts actuating the electric motor in the motor mode.

2. A control apparatus as set forth in claim 1, wherein the rotation controller increases a resistance to rotation of the drive shaft at least when the starter controller starts actuating the electric motor in the motor mode, thereby restricting the rotation of the electric motor.

3. A control apparatus as set forth in claim 2, wherein when the internal combustion engine is stopped from operating, the rotation controller serves to control the electric motor to stop the drive shaft from rotating during movement of a piston from a bottom dead center to a top dead center thereof within at least one of cylinders of the internal combustion engine with an intake valve and an exhaust valve for the one of the cylinders being closed, thereby increasing the resistance to the rotation of the drive shaft.

4. A control apparatus as set forth in claim 2, wherein the internal combustion engine also includes a throttle valve which works to open or close an intake passage through which air is admitted into cylinders of the internal combustion engine, and wherein when the internal combustion engine is stopped from operating, the rotation controller controls the electric motor to stop rotation of the drive shaft during movement of a piston from bottom dead center to top dead center thereof within at least one of the cylinders of the internal combustion engine with an exhaust valve for the one of the cylinders being closed, an intake valve for the one of the cylinders being opened, and the throttle valve being opened, the rotation controller subsequently closing the throttle valve after a given period of time has passed following stop of the internal combustion engine, thereby increasing the resistance to the rotation of the drive shaft.

5. A control apparatus as set forth in claim 2, wherein when the internal combustion engine is being stopped from operating, and when an amount of lift of the intake valve for at least one of cylinders of the internal combustion engine starts changing from a minimum amount of lift thereof to a maximum amount of lift thereof or when the amount of lift of the intake valve for at least one of cylinders of the internal combustion engine is increasing from the minimum amount of lift to the maximum amount of lift, the rotation controller controls the electric motor to stop rotation of the drive shaft, thereby increasing the resistance to the rotation of the drive shaft.

6. A control apparatus as set forth in claim 2, wherein the internal combustion engine also includes a valve timing controller which is capable of regulating a valve timing of an intake valve for each of cylinders of the internal combustion engine, and wherein when the internal combustion engine is stopped from operating, the rotation controller controls the electric motor to stop rotation of the drive shaft during movement of a piston from bottom dead center to top dead center thereof within at least one of cylinders of the internal combustion engine with an intake valve for the one of the cylinders being closed, and an intake valve for the one of the cylinders being opened, after a given period of time has passed following stop of the internal combustion engine, the rotation controller retarding the valve timing controller to close the intake valve, thereby increasing the resistance to the rotation of the drive shaft.

7. A control apparatus as set forth in claim 2, wherein the internal combustion engine also includes a clutch which works to selectively establish and block connection between the drive shaft of the internal combustion engine and an object to be driven by the drive shaft, and wherein said rotation controller engages the clutch to achieve the connection between the drive shaft and the object, thereby increasing the resistance to the rotation of the drive shaft.

* * * * *